(12) United States Patent
Purkait et al.

(10) Patent No.: US 11,645,091 B2
(45) Date of Patent: May 9, 2023

(54) SHELL CONVERSION FOR AN ENTERPRISE RESOURCE PLANNING (ERP) SYSTEM

(71) Applicant: ACCENTURE GLOBAL SOLUTIONS LIMITED, Dublin (IE)

(72) Inventors: Goutam Purkait, Tokyo (JP); Mitsuhiro Wake, Tokyo (JP)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 449 days.

(21) Appl. No.: 16/848,217

(22) Filed: Apr. 14, 2020

(65) Prior Publication Data

US 2021/0318891 A1  Oct. 14, 2021

(51) Int. Cl.
*G06F 9/445* (2018.01)
*G06F 8/35* (2018.01)
(Continued)

(52) U.S. Cl.
CPC ............ *G06F 9/44505* (2013.01); *G06F 8/35* (2013.01); *G06F 8/36* (2013.01); *G06Q 10/06313* (2013.01)

(58) Field of Classification Search
CPC .......... G06F 9/44505; G06F 8/35; G06F 8/36; G06Q 10/06313
See application file for complete search history.

(56) References Cited

U.S. PATENT DOCUMENTS 8,443,084 B2 * 5/2013 Challa ....................... G06F 8/65
709/224
9,342,805 B2 * 5/2016 Harjunkoski .......... G06Q 10/06
(Continued)

FOREIGN PATENT DOCUMENTS

JP   2019133541 A   8/2019

OTHER PUBLICATIONS

Gandhi, S/4HANA Conversion (Published Jun. 24, 2019) retrieved from https://blogs.sap.com/2019/06/24/s4hana-conversion/on Aug. 7, 2022 (Year: 2019).*
Sap S/4HANA Service of CTC, CTC Forum 2019 , ITOCHU Techno-Solutions Corporation, Oct. 25, 2019, 4 pages.
SI services to assist transfer to NTT Data GSL,SAP S/4HANA , Inc., Inc., Jan. 15, 2020, 1 page.
(Continued)

*Primary Examiner* — Lewis A Bullock, Jr.
*Assistant Examiner* — Theodore E Hebert
(74) *Attorney, Agent, or Firm* — Mannava & Kang, P.C.

(57) ABSTRACT

A digital content management system for using an enterprise resource planning (ERP) system converted from a legacy ERP using a shell conversion technique is provided. The system may include a final-converted ERP that communicates with one or more servers and one or more data stores in a network. The final-converted ERP may communicate with any number of data sources and may be converted from a legacy ERP using a shell conversion technique or process comprising: making a copy of the legacy ERR; creating a base shell from the copy of the legacy ERR; performing a Unicode conversion of the base shell of the legacy ERR; upgrading the Unicode converted base shell of the legacy ERP to a next generation ERR; performing a remediation of the upgraded next generation ERR; making a copy of the remediated and upgraded next generation ERR; creating at least one of a development ERP, a quality ERP, or a production ERR; and providing the final ERP based on at least one of the a development ERP, a quality ERP, or a production ERP.

20 Claims, 7 Drawing Sheets

(51) Int. Cl.
   *G06F 8/36*    (2018.01)
   *G06Q 10/06*   (2012.01)
   *G06Q 10/0631* (2023.01)

(56) References Cited

U.S. PATENT DOCUMENTS

| | | | | |
|---|---|---|---|---|
| 9,626,390 | B2* | 4/2017 | Bentzien | G06F 16/214 |
| 11,327,956 | B2* | 5/2022 | Kumar R C | H04L 9/3239 |
| 2012/0166393 | A1* | 6/2012 | Hoprich | G06F 16/21 |
| | | | | 707/634 |
| 2012/0239616 | A1* | 9/2012 | Cunningham | G06F 16/273 |
| | | | | 707/634 |
| 2014/0143263 | A1* | 5/2014 | Ritter | G06F 16/215 |
| | | | | 707/756 |
| 2016/0140117 | A1* | 5/2016 | Konrad | G06F 16/214 |
| | | | | 707/609 |
| 2016/0170977 | A1* | 6/2016 | Engelko | G06F 16/284 |
| | | | | 707/609 |
| 2016/0321056 | A1* | 11/2016 | Noonen | G06F 16/185 |
| 2017/0090892 | A1* | 3/2017 | Gass | G06F 8/76 |
| 2017/0097818 | A1* | 4/2017 | Heine | H04L 67/34 |
| 2017/0103329 | A1* | 4/2017 | Reddy | G06N 5/04 |
| 2017/0220613 | A1* | 8/2017 | Gass | G06F 16/2282 |
| 2018/0039490 | A1* | 2/2018 | Gass | G06F 8/427 |
| 2018/0150497 | A1* | 5/2018 | Stephen | G06F 16/254 |
| 2019/0312793 | A1* | 10/2019 | Hazen | H04L 41/0893 |
| 2019/0370405 | A1* | 12/2019 | Hoprich | G06F 16/901 |
| 2020/0012582 | A1* | 1/2020 | Sharma | G06F 11/3664 |
| 2020/0012970 | A1* | 1/2020 | Srivastava | G06F 16/23 |
| 2020/0159852 | A1* | 5/2020 | Meissner | G06F 8/65 |
| 2020/0310762 | A1* | 10/2020 | Schreiber | G06F 30/20 |
| 2021/0318891 | A1* | 10/2021 | Purkait | G06F 8/65 |
| 2021/0342246 | A1* | 11/2021 | Schreiber | G06F 11/3428 |

OTHER PUBLICATIONS

Legacy Migrations Not Going Wrong are [Online], IBM Japan Corp., 2017, 4 pages.

"Notice of Reasons for Refusal, Japan application No. 2021-067802" dated May 31, 2022, 14 pages with machine English translation.

* cited by examiner

400

┌─────────────────────────────────────────────────┐
│ Make a copy of the legacy enterprise resource planning (ERP) system
│ 410
└─────────────────────────────────────────────────┘
↓
Create a base shell from the copy of the legacy enterprise resource planning (ERP) system
420
↓
Perform a Unicode conversion of the base shell of the legacy enterprise resource planning (ERP) system
430
↓
Upgrade the Unicode converted base shell of the legacy enterprise resource planning (ERP) system to a next generation enterprise resource planning (ERP) system
440
↓
Perform a remediation of the upgraded next generation enterprise resource planning (ERP) system
450
↓
Make a copy of the remediated and upgraded next generation enterprise resource planning (ERP) system
460
↓
Create at least one of a development enterprise resource planning (ERP) system, a quality enterprise resource planning (ERP) system, or a production enterprise resource planning (ERP) system from the copy of the remediated and upgraded next generation enterprise resource planning (ERP) system
470
↓
Provide the final enterprise resource planning (ERP) system, the final enterprise resource planning (ERP) system based on at least one of the created development enterprise resource planning (ERP) system, quality enterprise resource planning (ERP) system, or production enterprise resource planning (ERP) system
480

FIG. 4

SHELL CONVERSION FOR AN ENTERPRISE RESOURCE PLANNING (ERP) SYSTEM

TECHNICAL FIELD

This patent application relates generally to digital content management, and more specifically, to systems and methods for shell conversion of enterprise resource planning (ERP) systems and applications.

BACKGROUND

Digital content management is becoming increasingly prevalent in the modern world. Finding ways to manage digital content or data in a secure and efficient manner is critical. An enterprise resource planning (ERP) system or application suite may help various organizational entities manage digital content or data for any number of enterprise activities. For example, an ERP may include a customer relationship management (CRM) platform, system, or application that may help collect, store, manage, and analyze data associated with various enterprise functions or activities. The ERP/CRM may provide an integrated solution of core enterprise processes using common databases maintained by a database management system. Thus, the ERP/CRM may facilitate information flow between many enterprise functions and may manage digital content and data communications with stakeholders and a variety of internal and external parties.

However, as digital content management is evolving and advancements in technology are creating newer generations of ERP platforms meant to replace older legacy ERPs, there is a growing need for transition to these newer systems, platforms, and applications. In other words, support systems and processes may be needed to facilitate the digital transformation and journey from legacy ERPs to next generation ERPs, which may include planning, installation, training, troubleshooting, maintenance, upgrading, remediating, extending, or termination products or services. Although there are several solutions available to support some of this transition, most conventional systems and approaches fail to provide a robust and holistic approach for digital content management, especially as it pertains to digital conversions of ERP systems.

BRIEF DESCRIPTION OF DRAWINGS

Features of the present disclosure are illustrated by way of example and not limited in the following Figure(s), in which like numerals indicate like elements, in which:

FIG. 4 illustrates a method for converting a digital content management system, according to an example;

DETAILED DESCRIPTION

Figure 1:
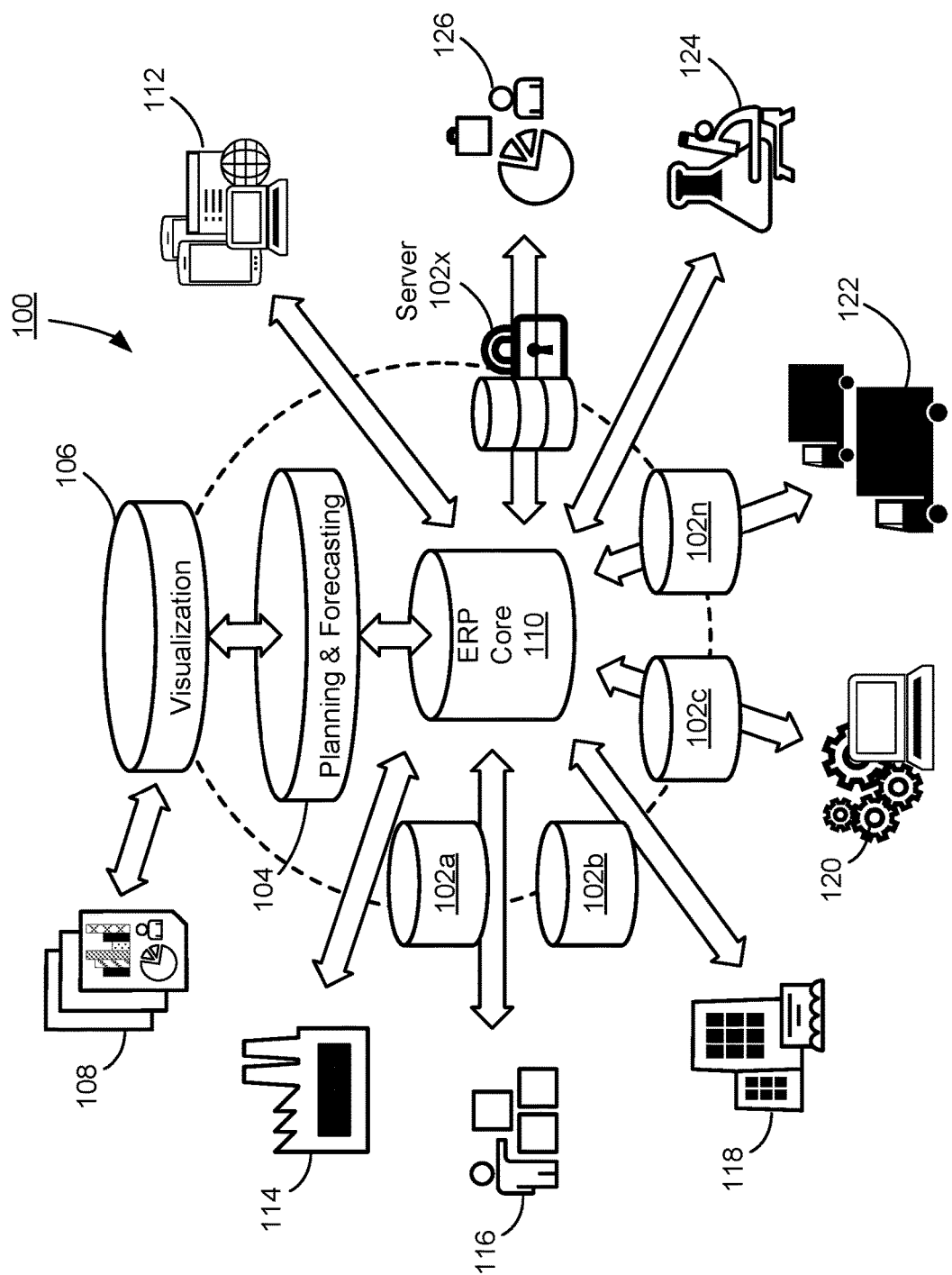
FIG. 1 illustrates a block diagram of a system environment for a system for managing digital content, according to an example.

For simplicity and illustrative purposes, the present disclosure is described by referring mainly to examples and embodiments thereof. In the following description, numerous specific details are set forth in order to provide a thorough understanding of the present disclosure. It will be readily apparent, however, that the present disclosure may be practiced without limitation to these specific details. In other instances, some methods and structures readily understood by one of ordinary skill in the art have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

As described above, digital content management systems are evolving and becoming an essential part of organizational entities. As a result of these technological developments, newer generation digital content management systems (such as enterprise resource planning (ERP) systems or applications) are replacing older legacy ERPs. However, with these transitions to newer platforms, support systems and processes may be needed to facilitate the digital transformation and journey from legacy ERPs to next generation ERPs, which may include planning, installation, training, troubleshooting, maintenance, upgrading, remediating, extending, or termination products or services.

Although there are several solutions available to support such transitions, most conventional systems and approaches fail to provide a robust and holistic approach for digital content management, especially as it pertains to digital conversions of ERP systems. For example, one traditional solution may deploy a process where a legacy landscape is really not taken into consideration at all. Such an approach typically involves building a future landscape using a generic hardware set up, and then creating, from-scratch, a complete digital content management solution on a new installation. In this example, the focus is clearly on high level business process re-engineering, where historical data and applications are not targeted for reuse in anyway. Thus, this solution may be inefficient and may lack proper treatment of legacy applications or data.

In other systems, the legacy landscape may be converted with existing applications and data. However, in most cases, proprietary tools may be required. Furthermore, such systems are generally very inflexible. For example, in situations where customers may have a need to retain most of their legacy setup, have flexibility to adjust unwanted legacy designs, or adapt and add new processes or tools, these systems that offer solutions to convert legacy landscapes with existing applications and data may often support only limited conversions, and may therefore not provide for the type of comprehensive transition or digital transformation that is often sought by organizational entities looking to upgrade their legacy ERPs.

The systems and methods described herein, however, may provide a more robust and holistic approach for digital content management, especially as it pertains to digital conversions or transition of legacy ERPs to next generation ERPs. The systems and methods described herein may provide a more flexible and customized approach that better caters to the needs or real-world customers by providing a wider range of options and customizations for each digital transformation and journey. The solutions described herein, for example, may allow various organization entities, especially enterprise customers, to upgrade or transition their legacy digital content management systems to newer ones with greater efficiency, lower cost and expenditure, and at increased speeds. Moreover, the conversions to digital content management systems and processes described herein may reduce complexity of conventional processes that typically require manual resources, involve cumbersome coordination of several components or approaches, or utilize inefficient and costly proprietary tools. Accordingly, the systems and methods described herein may therefore allow an organization entity (e.g., commercial, financial, government, etc.) to transition legacy ERPs to new generation ERPs using a more expedient, flexible, and cost-effective approach. The conversion techniques described herein may also be less error-prone and easier to use, all of which may enhance customer service and product support. These and other benefits and advantages will be more readily apparent in the description below.

FIG. 1 illustrates a block diagram of a system environment 100 for a system 110 for managing digital content, according to an example. In some examples, the system 110 may be a digital content management system 110 and may be used to manage, monitor, communicate, and analyze digital content or data from a variety of data sources. In particular, the digital content management system 110 may be used manage digital content in a system environment 100, such as an enterprise environment for an organizational entity. The organizational entity may be a financial entity, a commercial entity, a government entity, or other entity. In some examples, the system 110 may be enterprise resource planning (ERP) systems and applications, illustrated as ERP core 110 in system environment 100. It should be appreciated that the term "digital content management system," "system," and "ERR core," may be used interchangeably to describe the system 110 for managing digital content a described herein.

The digital content management system 110 may operate in or within a network or an enterprise environment where data is exchanged, and where products or services are being offered to customers. The system 110 may also store information or be able to receive information from a variety of internal, external, or other data sources associated with the organizational entity, its members, affiliates, partners, and/or its customers, suppliers, clients, or other parties. More specifically, the digital content management system 110 may provide real-time or near real-time management, exchange, and/or storage of data, as well as an artificial intelligence (AI) system that uses analytics and predictive modeling. For example, the digital content management system 110 may also use account management and predictive analytics to help provide digital content communications, as described in more detail below. Additionally, the digital content management system 110 may further include any number of system, such as clustering systems, machine learning (ML), or other artificial intelligence (AI) based systems, to provide predictive analytics or other similar features using digital content or data, also as described in more detail below.

In some examples, the system 110 may be enterprise resource planning (ERP) systems and applications, illustrated as ERP core 110. The ERP core 110 may be an updated or upgraded ERP system that may communicate with any number of ERP subsystems 102, shown as ERPs 102a, 102b, 102c, and 102n, in which the variable "n" may represent an integer greater than one. Furthermore, the ERPs 102 may also be secured ERPs, shown as 102x, in which the variable "n" may represent an integer greater than one. All together, the ERPs 102 may be distinct or integrated with the ERP core 110 to perform any or all of the functions associated with the system 110.

Functionally, the ERP core 110 and the ERPs 102 may individually or collectively provide communications with any number of data feeds, storage systems, internal or external systems or applications, and/or other sources for collecting and sending data and information, including third party or indirect sources, in order to perform any number of enterprise actions or functions. It should be appreciated that the ERP core 110 and/or ERPs 102 may include one or more application servers that host various ERP applications. These may include, for example, a customer relationship management (CRM) platform, system, or application. Each of the ERP core 110 and/or ERPs 102 may collect, store, manage, and interpret data associated with various enterprise functions or activities. For example, the ERPs 102 may provide an integrated and continuously updated view of core business processes using common databases maintained by the ERP core 110 in or within the system environment 100. The ERP core 110 and/or ERPs 102, for example, may also track enterprise resources (e.g., cash, raw materials, production capacity, etc.) as well as other information, such as corporate or business transactions (e.g., orders, purchase orders, payroll, ticketing, etc.). Furthermore, the applications that make up the ERP core 110 and/or ERPs 102 may share digital content or data across various departments (e.g., manufacturing, purchasing, sales, accounting, etc.) that utilize digital content or data. The ERP core 110 and/or ERPs 102, for instance, may facilitate information flow between many enterprise functions and may manage communications with stakeholders or other outside parties. As a result, the ERP core 110 and/or ERPs 102 may contain large quantities of information and data or be communicatively coupled to systems or platforms that contain large quantities of information and data.

For instance, the ERP core 110 and/or ERPs 102 may communicate data or digital content with a planning and forecasting subsystem 104, which in turn may communicate data and digital content with a visualization subsystem 106. In some examples, the visualization subsystem 106 may generate, provide, display, or output any number of reports 108. The visualization subsystem 106 may function in concert or be in communications with other systems or applications that that may assist in providing reports 108. For example, these systems or applications may include business intelligence, visualization, and other useful enterprise reporting tools, such as those offered by, but not limited to, Dundas BI®, Domo®, Sisense®, Yellowfin®, Sharepoint®, SAP®, etc. In some examples, the reports 108 may include volumetric analysis, process maps, customization statistics, configuration reports, process chain reports, etc. Volumetric analysis may include analysis of various business objects like sales orders or purchase orders. Process maps may include an overlay tool that provides client landscapes over a standard process map. Customization statistics may provide an overview of customization in terms of scope, usage, and other customizations. Configuration reports may help understand unused configurations versus high-frequency ones. Process chain reports may help provide sequence of activities to automate complex data flows.

In some examples, the ERP core 110 and/or ERPs 102 may communicate data or digital content via a network and to any number of web and mobile applications 112. The network may be a local area network (LAN), wide area network (WAN), the Internet, a cellular network, a cable network, a satellite network, or other network that facilitates communication between the ERP core 110 and/or ERPs 102 and any other system, component, or device in or out of the system environment 100. The network may further include one, or any number, of the exemplary types of networks mentioned above operating as a stand-alone network or in cooperation with each other. For example, the network may utilize one or more protocols of one or more systems, components, or servers to which they are communicatively coupled. The network may facilitate transmission of data according to a transmission protocol of any of the devices and/or systems in the network. Although the network is generally described as a single network, it should be appreciated that in some examples, the network may include a plurality of interconnected networks as well.

The web and mobile applications 112 may be included in Internet-based or mobile device based systems or applications of various users, namely those in an enterprise environment. The web and mobile applications 112 may be accessed via any number of computing devices or any device having computer functionality, such as a smartphone, a tablet, a laptop, a watch, a desktop, a server, or other computing device. The computing devices may be mobile devices that are communicatively coupled to a network and may be enabled to interact with various network elements over the network.

In some examples, the computing devices, via the web and mobile applications 112, may execute an application allowing a user of the computing devices to interact with various network elements on the network. For instance, the computing devices may receive data from user input, a database, a file, a web service, and/or via an application programming interface (API). Additionally, the computing devices may execute a browser or application, e.g., web and mobile applications 112, to enable interaction between the computing devices and the system 110 (or any other system, component, or element via the network) in the system environment 100. In an example, the computing devices may interact with the system 110 through application programming interfaces (APIs) running on a native or remote operating systems of the computing devices.

In some examples, the ERP core 110 and/or ERPs 102 may help facilitate a number of enterprise functions or actions. For example, these may include, among other things, production 114, purchasing 116, accounting 118, analytics 120, logistics 122, research and development 124, and/or sales 126. Production 114 may include any number of high efficiency operations and maintenance actions, which be evident in factory or manufacturing settings. These may also include automated solutions, e.g., digital plants, and/or supply chain optimization, all of which may also include AI-based simulation (e.g., powered supply chain models, etc.).

Purchasing 116 may include any number of internal, external, or cross-functional optimizations in facilitating transactions with suppliers, vendors, and/or their related systems. In some examples, purchasing 116 may include any corporate or business transactions, such as orders, purchase orders, payroll, ticketing, payment transactions, etc.

Accounting 118 may provide for various types of data integration with financial institutions. For example, this may include coordination with external entities, such as lenders, banks, government, payment networks, accounting services, etc. In some examples, the accounting 118 functions may be associated with purchasing 116 as well, such as payroll, digital purchases, etc. Other features associated with purchasing 116 may include deposits, withdrawals, loans, clearing, receivables debt receivables, etc.

Analytics 120 may include any number of actions or features associated with analytics, statistical calculations, or econometrics, or systems or applications that specialize in these functions. These may include, but not limited to, those by Tableau®, Domo®, Salesforce®, JMP®, MATLAB®, QlikSense®, SPSS®, SAS®, Stata®, Alteryx®, Analytica®, etc. In some examples, analytics 120 may be aided or facilitated by various machine learning (ML) or AI-based techniques or solutions.

Logistics 122 may include any number of features associated with market information and terms of trading. In some examples, logistics 122 may also include any features or actions associated with logistics control, which may provide delivery coordination, customer service, and/or other related functions. Block chain and AI-based techniques may also aid logistics 122.

Research and development (R&D) 124 may involve any number of actions using advance technology, especially managing data or digital content associated with research and development. For instance, these may involve R&D data associated with all sorts of disciplines, such as engineering, biotechnology, economics, etc. In some examples, artificial intelligence (AI) and/or machine learning (ML) techniques may be used to facilitate actions associated with research & development 124.

Sales 126 may include any number of customer-facing features and actions. These may include customer journey, user experience, customer service, returns management, order approvals, sales training, e-commerce, customer reporting, etc. Sales 126 may include functions that overlap or coordinate with production 114, purchasing 116, accounting 118, logistics 122, etc.

There may be any number of ways the ERP core 110 and/or ERPs 102 may collect data for its various uses. In other words, the ERP core 110 and/or ERPs 102 may receive from or transmit data to or via any number of data sources. These may include documents, web feeds, machine and sensor data, geolocation data. Data received from documents, for example, may include files, emails, faxes, scans, or other documents that are transmitted, received, and stored in an enterprise or personal use environment.

The web feeds may be yet another source of data. Data received at web feeds may include data from various web sources, such as websites, social media, syndication, aggregators, or from scraping. Websites may include uniform resource locator (URL) or other website identifier. This may also include RSS feeds, which allow users to access updates to online content. Data from social media may also include any type of internet-based application built upon creation and exchange of user-generated content, which may include information collected from social networking, microblogging, photosharing, news aggregation, video sharing, livecasting, virtual worlds, social gaming, social search, instant messaging, or other interactive media sources. Scraping may include web scraping, web harvesting, data scraping, or other techniques to extract data from websites or other Internet sources. These techniques may involve fetching (e.g., downloading content or data from a web page) and extraction (e.g., parsing, searching, reformatting, copying, compiling, monitoring, etc.) of data. Other forms of scraping may also include document object model (DOM) parsing, computer vision, and natural language processing (NLP) to simulate human browsing to enable gathering web page content for offline parsing.

The machine and sensor data may be another source of data and information in an enterprise environment. For example, in an enterprise network, there may be physical mobile devices, vehicles, appliances, and other enterprise systems that are equipped with electronics, software, and sensors, where most, if not all, of these items are within a network and share some measure of connectivity which enable these and other pieces of equipment to connect, communicate, and exchange data. This may allow various systems, objects, and items in an enterprise environment to be detected, sensed, or remotely controlled over one or more networks, creating a vast array of enterprise functionalities. These may include abilities to provide data analytics on equipment, assessment of equipment health or performance, improved efficiency, increased accuracy or function, economic benefit, reduction of human error, etc. By creating a "smarter" environment and leveraging interactivity between various pieces of equipment in an enterprise network, the machine and sensor data may provide significant amounts of information and data that can be collected. Together with other technologies and systems described herein, the machine and sensor data may help enable the ERP core 110 and/or ERPs 102 provide a more efficient way to manage digital content and data.

Geolocation data may include information or data associated with identification or estimation of real-world geographic location of an object, such as a radar source, mobile device, or web-based computer or processing device. Geolocation data may provide specific geographic coordinates or data that may be used for monitoring location, distinct or together with, other various positioning systems or applications. For example, the geolocation data may include internet protocol (IP) address, media access control (MAC) address, radio-frequency identification (RFID), global positioning system (GPS), embedded software number, WiFi positioning system (WPS), device fingerprinting, canvas fingerprinting, etc. The geolocation data may include other self-disclosing or self-identifying information, including but not limited to country, region county, city, postal/zip code, latitude, longitude, time zone, domain name, connection speed, internet service provider (ISP), language, proxies, or other information that can be used to piece together and trace location. This and other data in the data may be collected, monitored, analyzed, and/or incorporated with for use by the ERP core 110 and/or ERPs 102.

It should be appreciated that the ERP core 110 and/or ERPs 102 may further store information and data associated with data governance, assets, analysis, modeling, maintenance, administration, access, erasure, privacy, security, cleansing, quality, integration, business intelligence, mining, movement, warehousing, records, identify, theft, registry, publishing, metadata, planning, and other disciplines related to managing data as a value resource. The ERP core 110 and/or ERPs 102 may also store information and data associated with operational reporting, controls, and decision-making. This may include, for example, information or data used in in reporting, controls, and operational decision support. Integration of data the ERP core 110 and/or ERPs 102 may involve cleaning, resolving redundancy, checking against business rules, and other data integration techniques, such as data virtualization, federation, and extract, transform, and load (ETL). The ERP core 110 and/or ERPs 102 may also store and use data for tactical and strategic decision support.

The ERP core 110 and/or ERPs 102 may be or include one or more repositories of integrated data and used to store current and historical data and to create analytical report(s) for advanced enterprise knowledge. Data passed through the ERP core 110 and/or ERPs 102 may also involve cleansing to ensure data quality and usage. ETL may also be used, as well as other techniques, involving staging, data integration, and access features. Ultimately, data in the ERP core 110 and/or ERPs 102 may be transformed and catalogued so that it may be used for data mining, analytics, and other business intelligence purposes, such as marketing, decision support, etc. Other data stores may also be associated with the ERP core 110 and/or ERPs 102, such as data marts, data vaults, data warehouses, data repositories, etc.

It should be appreciated that the systems and data stores described herein may include volatile and/or nonvolatile data storage that may store data and software or firmware including machine-readable instructions. The software or firmware may include subroutines or applications that perform the functions of the system 110 and/or run one or more application that utilize data from the system 110. Other various server components or configurations may also be provided.

The ERP core 110 and/or ERPs 102 may further include any number of servers that facilitate, coordinate, and manage information and data. For example, the servers, as well as others, may include any number or combination of the following servers: exchange servers, content management server, application servers, database servers, directory servers, web servers, security servers, enterprise servers, and analytics servers. Other servers to provide data security and protection may also be provided.

There may be any number of examples of hardware that may be used for any of the servers, layers, subsystems, and components of the ERP core 110 and/or ERPs 102 described herein. For example, the ERP core 110 and/or ERPs 102 may include any number of layers, processors, systems or subsystems, with features and functionalities that may be helpful in data management, predictive analytics, and machine learning. The ERP core 110 and/or ERPs 102 may also include any number of application layers. For example, an applications layer may include any number or combination of systems and applications that interface with users or user-interfacing tools in an enterprise or a personal environment. The ERP core 110 and/or ERPs 102 may include or be associated with processors, which in turn may be an integrated circuit, and may execute software or firmware or comprise custom processing circuits, such as an application-specific integrated circuit (ASIC) or field-programmable gate array (FPGA). The ERP core 110 and/or ERPs 102 may also include any number of interfaces, which may be hardware, network, or software interfaces that serves to facilitate communication and exchange of data between any number of or combination of equipment, protocol layers, or applications.

It should be appreciated that a layer as described herein may include a platform and at least one application. An application may include software comprised of machine-readable instructions stored on a non-transitory computer readable medium and executable by a processor. The systems, subsystems, and layers shown in FIG. 1 or other figure may include one or more servers or computing devices. A platform may be an environment in which an application is designed to run on. For example, a platform may include hardware to execute the application, an operating system (OS), and runtime libraries. The application may be compiled to run on the platform. The runtime libraries may include low-level routines or subroutines called by the application to invoke some of behaviors, such as exception handling, memory management, etc., of the platform at runtime. A subsystem may be similar to a platform and may include software and hardware to run various software or applications.

Although single data units, servers, systems, or subsystems may be shown in FIG. 1, it should be appreciated that multiple data units, servers, systems, subsystems may be used and these elements may also be connected via one or more networks. Also, middleware (not shown) may include in the digital content management system 110 as well. The middleware may include software hosted by one or more data units, servers, or systems, or it may include a gateway or other related element. Such middleware may be used to enhance data processing, edge-based analytics, or other related operations. Furthermore, it should be appreciated that some of the middleware or system elements may or may not be needed to achieve functionality. Other types of servers, middleware, systems, platforms, and applications not shown may also be provided at the back-end to facilitate the features and functionalities of the digital content management system 110.

It should be appreciated that the digital content management system 110 may be platform independent. In other words, online applications associated with the digital content management system 110 may be used across various platforms, such as Windows®, iOS®, Unix®, Linux®, or other operating systems. The digital content management system 110 may also be hosted, in full or in part, in the cloud, provisioned/accessed via the web, or provided locally/remotely via on-site premises.

Within the digital content management system 110, there may be a large amount of data that is exchanged, and the exchanged data may sensitive or personal. With new laws and regulations surrounding sensitive personal data in possession by organizational entities, the digital content management system 110 described herein may also provide a more robust approach to handle and process potentially sensitive personal data, as is required.

The General Data Protection Regulation (GDPR), for example, is a new regulation recently passed by the European Parliament (EP), the Counsel of the European Union (EU), and the European Commission (EC) in order to strengthen and unify data protection for individuals within the EU. The GDPR specifically addresses the export of personal data outside of the EU and aims to give control back to citizens and residents over their personal data, as well as to simplify the regulatory environment for international business. These and other new laws, domestic or international, are having an impact to companies, organizations, and entities that are entrusted or in possession of private or personal data. In order to comply with these new laws and regulations, such as the GDPR, organizational entities may need to understand what data and information they possess, why they possess it, and the potential sensitivity of that that data. The digital content management system 110, as described herein, may therefore provide a more dynamic and scientific approach to the digital transformation of legacy ERPs to newer generation ERPs while maintaining sensitivity of such data.

Ultimately, the digital content management system 110 may allow an organization entity (e.g., commercial, financial, government, etc.) to provide a more efficient, flexible, and cost-effective approach to transition to next generation ERPs that may overcome the adverse effects and shortcomings of conventional solutions.

Figure 2A:
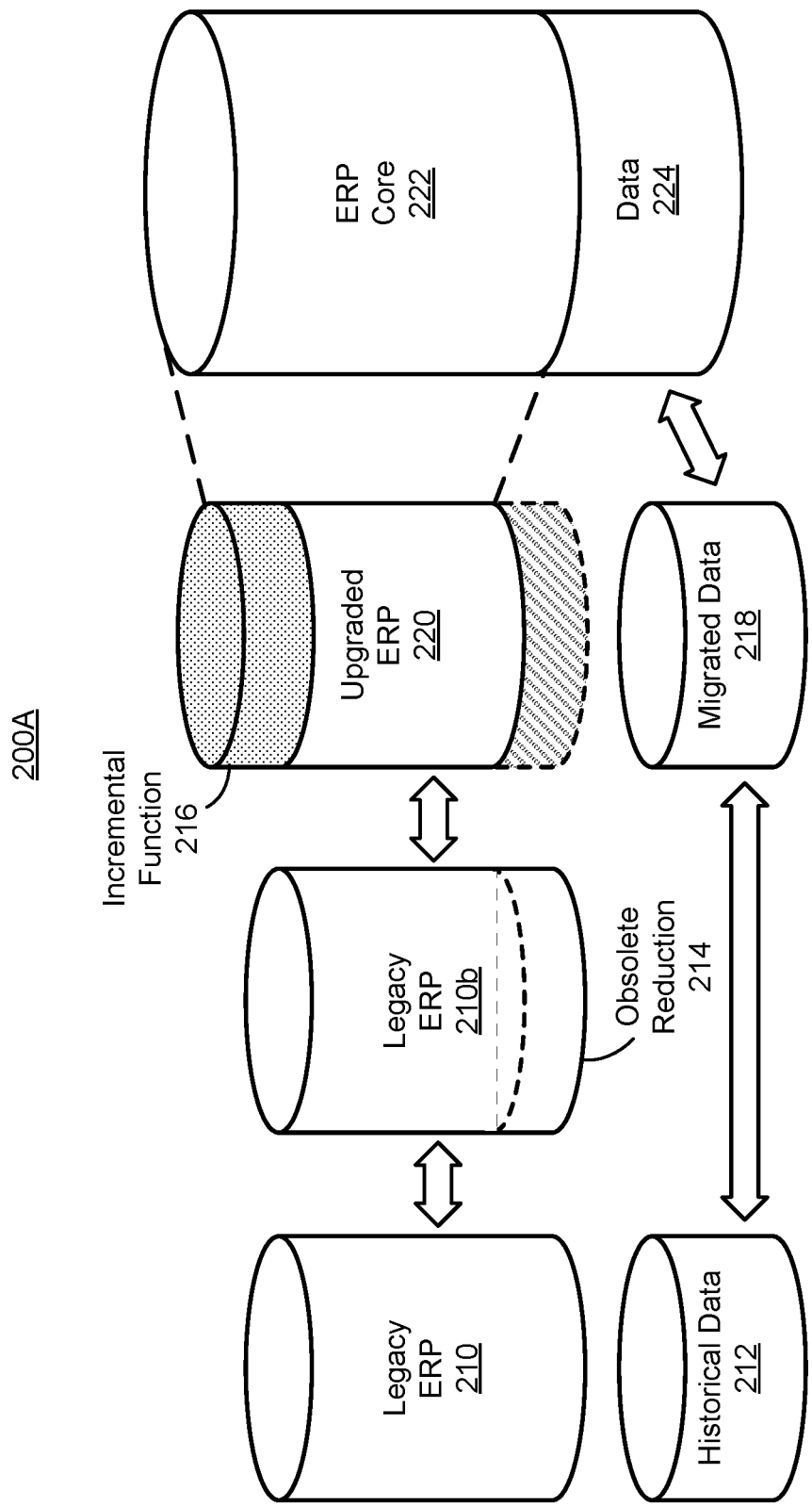
FIGS. 2A-2B illustrate block diagrams for a conversion of a digital content management system, according to an example.
Figure 2B:
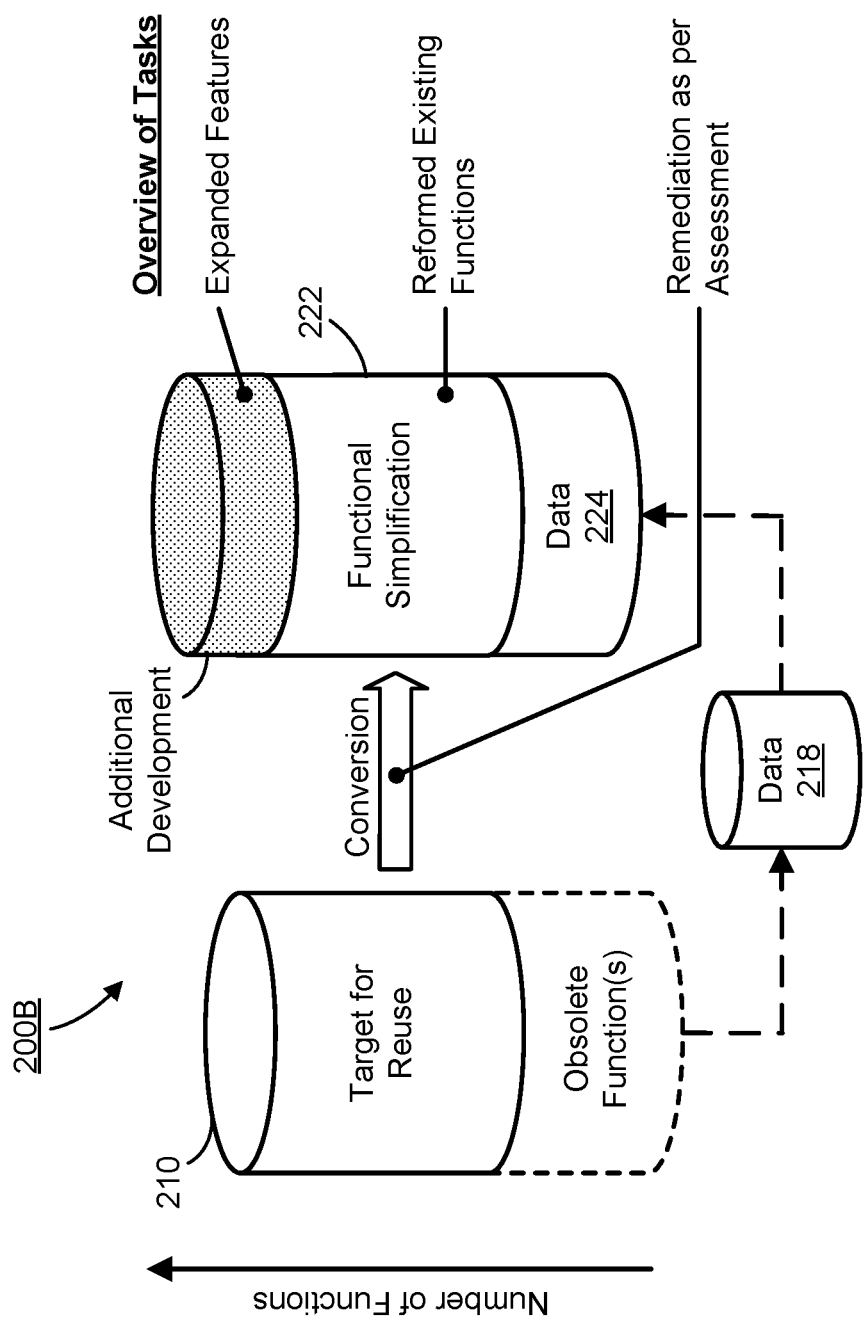

FIGS. 2A-2B illustrates block diagrams 200A and 200B for a conversion of a digital content management system 110, according to an example. As shown in the block diagram 200A, there may be a legacy ERP 210, which may be a pre-converted or pre-updated digital content management system 110. In some examples, the legacy ERP 210 may be an SAP® ERP. The legacy ERP 210 may also include historical data 212 that may be relied upon by an organizational entity. This historical data 212 may be used for any of the functions and features described above, such as production 114, purchasing 116, accounting 118, analytics 120, logistics 122, research and development 124, and/or sales 126 of FIG. 1. In order to begin converting the legacy ERP 210, the historical data 212 may be separated or dissociated from the legacy ERP 210 itself, and a shell 210b of the legacy ERP may be created or produced. The shell 210b of the legacy ERP, in some examples, may be a copy of the legacy ERP 210, and may include most, if not all, the functionality of the legacy ERP 210, just without the historical data 212, which may be customer-specific data or other digital content which may be designated for use in the converted ERP core 222.

To continue the transformation of the legacy ERP 210, an inventory or remediation assessment of the shell 210b of the legacy ERP may be taken. In this inventory, some obsolete applications, functions, code, components, or digital content of the shell 210b of the legacy ERP may be identified and removed. This process may be referred to an obsolete reduction 214 that removes these obsolete components, or components no longer needed or desired, from the shell 210b of the legacy ERP. As part of this upgrading or conversion process, it may also be determined, via the inventory or remediation process, that there are new applications, functions, code, components, or digital content that may need to added to the shell 210b of the legacy ERP 210. So in addition to obsolete reduction 214, the conversion or upgrading of the shell 210b of the legacy ERP to an upgraded ERP 220 may include an incremental function 216 to add these newly identified (or desired/needed) components.

While the legacy ERP 210 is upgraded to the upgraded ERP 220, it should be appreciated that the historical data 212 may be concurrently converted to migrated data 218. This conversion may include formatting, remediation, cleansing, transformation, or other similar actions so that the historical data 212 may be compatibly used in the upgraded ERP 220. Taking the upgraded ERP 220, with obsolete reduction 214 and incremental function 216, the new ERP core 22 may be created. Data 224, which may have derived from the migrated data 218 may then be added to the ERP core 222 to form a converted digital content management system 110.

In some examples the ERP core 222 may be SAP® ERP S/4 HANA, which may be a widely-used next generation ERP. It should be appreciated that the S/4 HANA may be cover various day-to-day processes of an enterprise, such as order-to-cash, procure-to-pay, plan-to-product, and request-to-service, and other various core capabilities. In many ways, this next generation ERP may integrate functions from various lines of business actions together with various industry solutions, and may also re-integrate portions of various legacy ERP products, such as SAP® SRM, SAP® CRM, and SAP® SCM. But as described above, the SAP® ERP S/4 HANA may only run on its SAP® HANA database and may not be compatible with databases that worked with earlier versions of SAP® ERP. Thus, for any enterprise using any prior SAP® legacy ERP, a digital conversion may be needed, and the systems and methods described herein may provide an efficient, low-cost, and flexible solution to achieve this transformation.

FIG. 2B illustrates a simplified version of FIG. 2A. As shown in the block diagram 200B of FIG. 2B, the digital conversion process may help transform a legacy ERP 210 to a new ERP core 222. More specifically, FIG. 2B illustrates the conversion of a digital content management system 110 with an emphasis on the number of functions being added, subtracted, and converted. For example, the digital conversion process may analyze a legacy ERP 210 and identify: (1) target components for reuse, and (2) obsolete functions or data that need to be removed. Meanwhile, the data 218 associated or used by the legacy ERP 210 may be dissociated, analyzed, reformatted, migrated, and integrated into the final ERP core 222, which during the conversion process, transforms applications or digital content for reuse and simplifies them for use in the new ERP core 222, removes all the obsolete functions, and adds additional development. As the number of functions increases, there may be additional development that is added. The final ERP core 222, for example, may include a final overview of tasks that includes expanded features, reformed existing functions, and migrated data compatible with the new ERP core 222 for use by the digital content management system 110.

Figure 3:
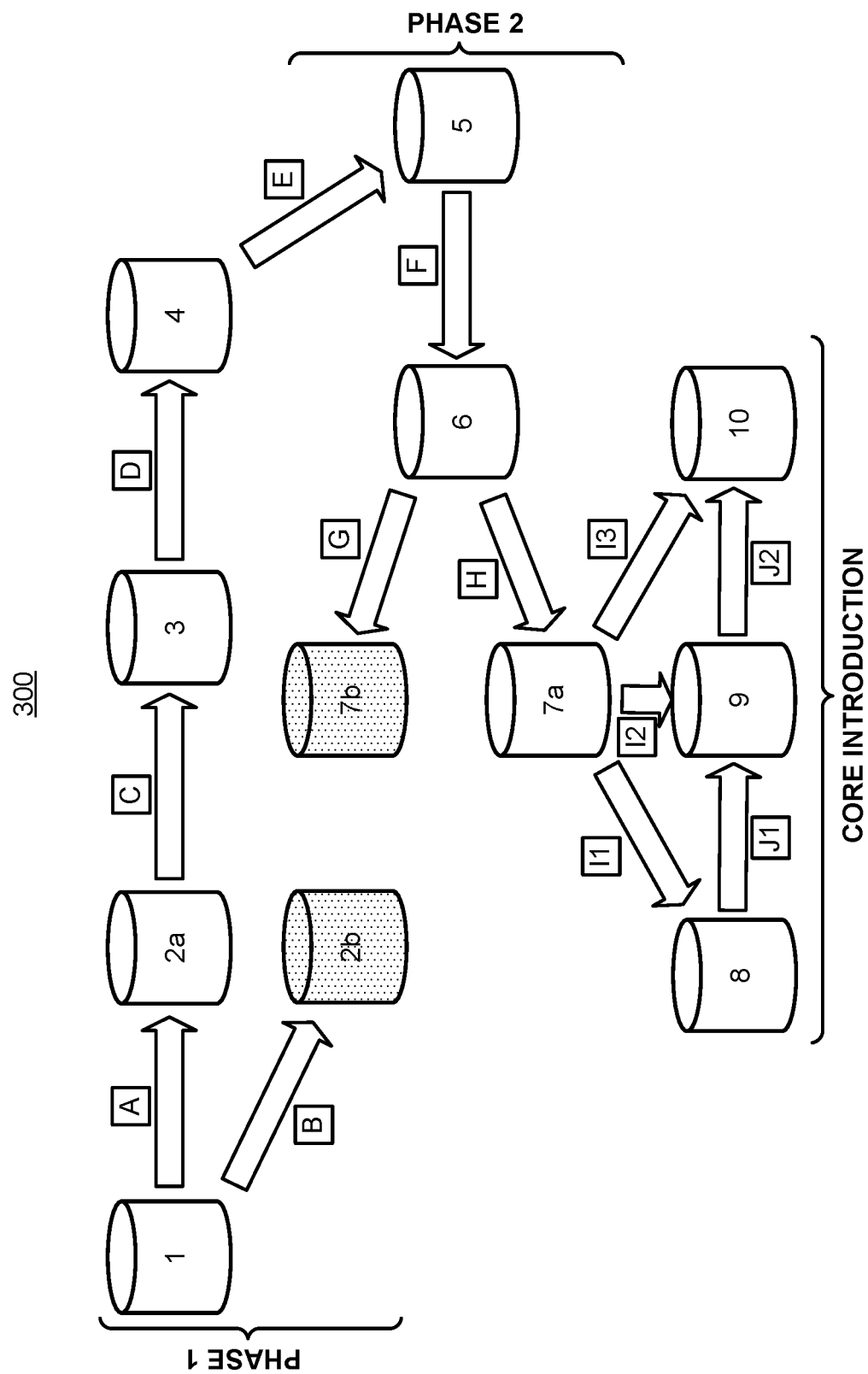
FIG. 3 illustrates a block diagram for phases of a conversion of a digital content management system, according to an example.

FIG. 3 illustrates a block diagram 300 for conversion phases of a digital content management system, according to an example. As shown in the block diagram 300, there may be several phases in which the digital conversion of a legacy ERP to a new ERP core may take place. For example, there may be Phase 1, Phase 2, and a Core Introduction phase. In some examples, Phase 1 may include a Unicode conversion, Phase 2 may include an S/4 conversion, and S/4 ERP core introduction. Although the examples used in block diagram 300, and elsewhere, are generally directed to SAP® legacy ERP to SAP® ERP S/4 HANA conversion, it should be appreciated that the digital transformation and shell conversion process may be applicable to any number of legacy ERP to new generation ERP core conversions.

In Phase 1, the legacy ERP (1) may include an SAP® ERP central component (ECC) 6.0 with enhancement packages 4 (Eph4) (ECC 6.0 Eph4) production environment. At (A), a shell conversion may occur. In some examples, this may involve copying the current ECC 6.0 Eph4 production environment and creating a first copy (2*a*) of the current assessment environment. It should be appreciated that at a second copy of the current assessment environment may also be generated. In other words, at (B), a second copy (2*b*) of the current assessment environment (e.g., ECC 6.0 Eph4) may be produced. In this way, the second copy (2*b*) may be stored as a potential backup or redundant copy for other various uses (such as testing, development, etc.). At (C), the first copy (2*a*) may be duplicated without data. In other words, the environment with only applications (not data) may be copied to form a base shell (3). This base shell (3), for example, may be only the applications associated with ECC 6.0 Eph4. Using the first copy (2*a*) to create the base shell (3) may help minimize or eliminate contamination or errors of the original legacy ERP (1). In scenarios where Unicode conversion is required, at (D), the base shell (3) may be converted to a Unicode converted base shell (4) (e.g., a ECC 6.0 Eph4 Unicode converted).

Once the Unicode conversion (5) has completed, the Unicode converted base shell (4) may undergo a next generation ERP conversion at (E) and Phase 2 may begin. For instance, the Unicode converted base shell (4) (or ECC 6.0 Eph4 Unicode converted) may be compatible for conversion to a next generation conversion (5) (e.g., S/4HANA 1809 release or "S/4HANA 1809"). The next generation conversion (5) may then be simplified or remediated, at (F), to a simplified or remediated next generation conversion (6) or "S/4HANA 1809 remediated." At (H), the remediated next generation conversion (6) may be copied to create a first copy (7*a*) of the remediated next generation conversion.

Like the second copy (2*b*) of legacy ERP (1) described above, a second copy (7*b*) of the remediated next generation conversion (6) may also be created through a system copy process (G). In some examples, the first copy (7*a*) may be referred to as a "golden copy" and the second copy (7*b*) may be referred to as a "baseline copy." Here, the golden copy may serve as the base for future development, quality, and production, and the baseline copy may serve as the environment for performing various shell conversion tests. Moreover, the golden copy and/or baseline copy may serve as the backup or redundant copy to help create efficiencies should there may errors in the digital conversion process. Rather than restarting from the beginning, having the first copy (7*a*), for example, may create a new starting point if needed in the conversion process. The golden copy, in this example, may be an "S/4HANA 1809 golden copy" from which the Core Introduction phase may take place.

Using the first copy (7*a*) (e.g., S/4HANA 1809 golden copy), the digital transformation process may build various environments for the Core Introduction. For example, a development environment (8) or "S/4HANA 1809 development" may be built (11) from the golden copy. The development environment (8) may be the environment from which future development work may be performed. A quality environment (9) or "S/4HANA 1809 quality" may also be built (12) from the golden copy with some data transport (J1) from the development environment (8). The quality environment (9) may be the environment from which future quality assessment work may be performed. A production environment (10) or "S/4HANA 1809 production" may also be built (13) from the golden copy with some data transport (J2) from the quality environment (9). The production environment (10) may be the environment from which future production work may be performed. These development, quality, and production versions may then form the bases of the next or newer generation ERP 222, described herein, for use in the digital content management system 110.

FIG. 4 illustrates a method 400 for converting a digital content management system, according to an example. The method 400 is provided by way of example, as there may be a variety of ways to carry out the method described herein. Although the method 400 is primarily described as being performed by system 110 and/or subsystems 102 as shown in FIG. 1, the method 400 may be executed or otherwise performed by other systems, or a combination of systems. Each block shown in FIG. 4 may further represent one or more processes, methods, or subroutines, and one or more of the blocks may include machine-readable instructions stored on a non-transitory computer-readable medium and executed by a processor or other type of processing circuit to perform one or more operations described herein.

At 410, a copy of the legacy enterprise resource planning (ERP) system may be made. In some examples, a second copy of the legacy enterprise resource planning (ERP) system may be made as well. Here, the second copy may serve as a backup copy of the legacy enterprise resource planning (ERP) system.

At 420, a base shell may be created. In some examples, the base shell may be created from the copy of the legacy enterprise resource planning (ERP) system. In some examples, creating the base shell from the copy of the legacy enterprise resource planning (ERP) system may also include identifying target applications for reuse in the final enterprise resource planning (ERP) system. In some examples, this may also include identifying obsolete applications or functions, as well as dissociating historical data associated with the copy of the legacy enterprise resource planning (ERP) system. In some examples, this may further involve formatting and migrating the historical data, and re-associating the historical data with the copy of the remediated and upgraded next generation enterprise resource planning (ERP) system.

At 430, in the event a Unicode conversion may be required, a Unicode conversion of the base shell of the legacy enterprise resource planning (ERP) system may be performed.

At 440, the Unicode converted base shell of the legacy enterprise resource planning (ERP) system may be upgraded to a next generation enterprise resource planning (ERP) system.

At 450, a remediation of the upgraded next generation enterprise resource planning (ERP) system may be performed. In some examples, performing the remediation of the upgraded next generation enterprise resource planning (ERP) system may also involve remediating the target applications for reuse in the final enterprise resource planning (ERP) system. At times, this may also include adding additional applications or functions to the upgraded next generation enterprise resource planning (ERP) system.

At 460, a copy may be made of the remediated and upgraded next generation enterprise resource planning (ERP) system. In some examples, this copy may be referred to as a "golden copy." In some examples, a second copy of the remediated and upgraded next generation enterprise resource planning (ERP) system may be provided. Here, the second copy, also referred to as a baseline copy, may serve as a backup copy of the remediated and upgraded next generation enterprise resource planning (ERP) system.

At 470, the copy of the remediated and upgraded next generation enterprise resource planning (ERP) system may be used to create at least one of a development enterprise resource planning (ERP) system, a quality enterprise resource planning (ERP) system, or a production enterprise resource planning (ERP) system.

At 480, the final enterprise resource planning (ERP) system may be provided. In some examples, as described above, the final enterprise resource planning (ERP) system may be based on at least one of the created development enterprise resource planning (ERP) system, quality enterprise resource planning (ERP) system, or production enterprise resource planning (ERP) system. As described above, the final enterprise resource planning (ERP) system may communicate with at least one of the following data sources: a website, a document, a database, a web feed, a sensor, a geolocation data source, a server, an analytics system, a mobile computing device, a planning and forecasting system, or a visualization and reporting system. It should be appreciated that the method 400 may include a variety of other actions, such as creating more copies, additional data process (e.g., ETL), or other actions associated with digital content transformation and upgrades.

By providing a shell conversion technique or process to transform a legacy ERP to a next generation ERP, the systems and methods described herein may provide a more flexible and customized approach for ERP conversion that is more comprehensive, faster and more expedient, and minimizes energy consumption. As a result, it should be appreciated that examples described herein may have an adaptable structure and offer many advantages over other solutions.

Figure 5:
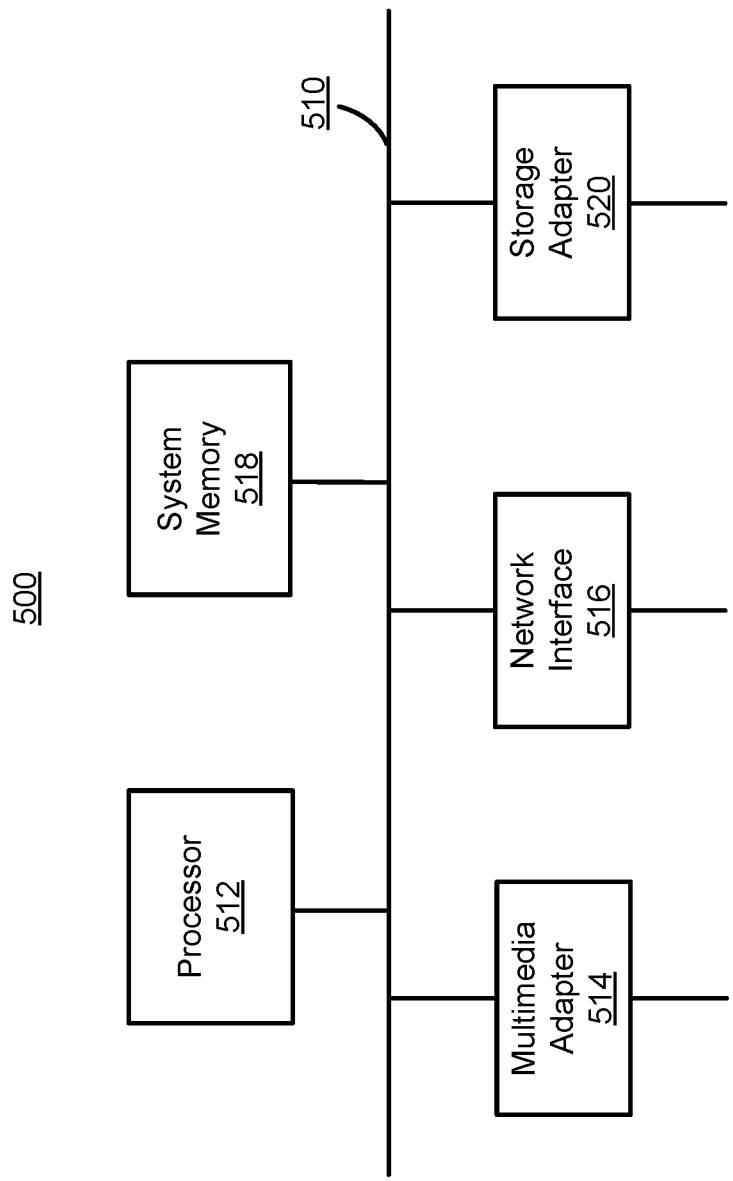
FIG. 5 illustrates a block diagram of a computer system for converting a digital content management system, according to an example.

FIG. 5 illustrates a block diagram of a computer system 500, according to an example. The computer system 500 may be part of or any one of the ERP core 110, the ERPs 102, the digital content management system, and/or other system to perform the functions and features described herein. The computer system 500 may include, among other things, an interconnect 510, a processor 512, a multimedia adapter 514, a network interface 516, a system memory 518, and a storage adapter 520.

The interconnect 510 may interconnect various subsystems, elements, and/or components of the computer system 500. As shown, the interconnect 510 may be an abstraction that may represent any one or more separate physical buses, point-to-point connections, or both, connected by appropriate bridges, adapters, or controllers. In some examples, the interconnect 510 may include a system bus, a peripheral component interconnect (PCI) bus or PCI-Express bus, a HyperTransport or industry standard architecture (ISA)) bus, a small computer system interface (SCSI) bus, a universal serial bus (USB), IIC (12C) bus, or an Institute of Electrical and Electronics Engineers (IEEE) standard 1394 bus, or "firewire," or other similar interconnection element.

In some examples, the interconnect 510 may allow data communication between the processor 512 and system memory 518, which may include read-only memory (ROM) or flash memory (neither shown), and random access memory (RAM) (not shown). It should be appreciated that the RAM may be the main memory into which an operating system and various application programs may be loaded. The ROM or flash memory may contain, among other code, the Basic Input-Output system (BIOS) which controls basic hardware operation such as the interaction with one or more peripheral components.

The processor 512 may be the central processing unit (CPU) of the computing device and may control overall operation of the computing device. In some examples, the processor 512 may accomplish this by executing software or firmware stored in system memory 518 or other data via the storage adapter 520. The processor 512 may be, or may include, one or more programmable general-purpose or special-purpose microprocessors, digital signal processors (DSPs), programmable controllers, application specific integrated circuits (ASICs), programmable logic device (PLDs), trust platform modules (TPMs), field-programmable gate arrays (FPGAs), other processing circuits, or a combination of these and other devices.

The multimedia adapter 514 may connect to various multimedia elements or peripherals. These may include a devices associated with visual (e.g., video card or display), audio (e.g., sound card or speakers), and/or various input/output interfaces (e.g., mouse, keyboard, touchscreen).

The network interface 516 may provide the computing device with an ability to communicate with a variety of remove devices over a network and may include, for example, an Ethernet adapter, a Fibre Channel adapter, and/or other wired- or wireless-enabled adapter. The network interface 516 may provide a direct or indirect connection from one network element to another, and facilitate communication and between various network elements.

The storage adapter 520 may connect to a standard computer-readable medium for storage and/or retrieval of information, such as a fixed disk drive (internal or external).

Many other devices, components, elements, or subsystems (not shown) may be connected in a similar manner to the interconnect 510 or via a network. Conversely, all of the devices shown in FIG. 5 need not be present to practice the present disclosure. The devices and subsystems can be interconnected in different ways from that shown in FIG. 5. Code to implement the dynamic approaches for payment gateway selection and payment transaction processing of the present disclosure may be stored in computer-readable storage media such as one or more of system memory 518 or other storage. Code to implement the dynamic approaches for payment gateway selection and payment transaction processing of the present disclosure may also be received via one or more interfaces and stored in memory. The operating system provided on computer system 500 may be MS-DOS®, MS-WINDOWS®, OS/2®, OS X®, IOS®, ANDROID®, UNIX®, Linux®, or another operating system.

Figure 6B:
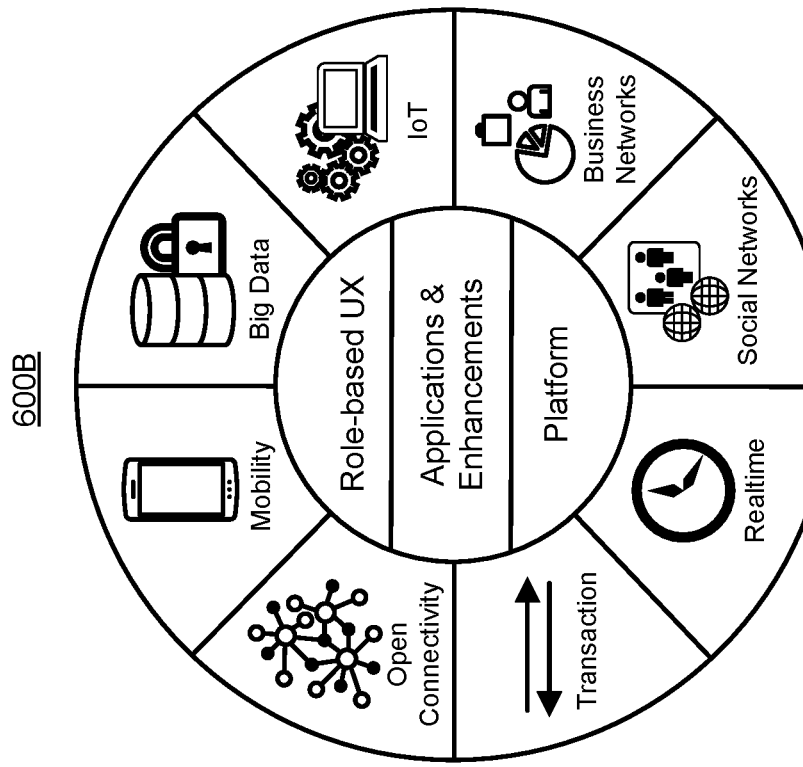
FIGS. 6A-6B illustrate graphs of expanded features and advancements associated with converting a digital content management system, according to an example.
Figure 6A:
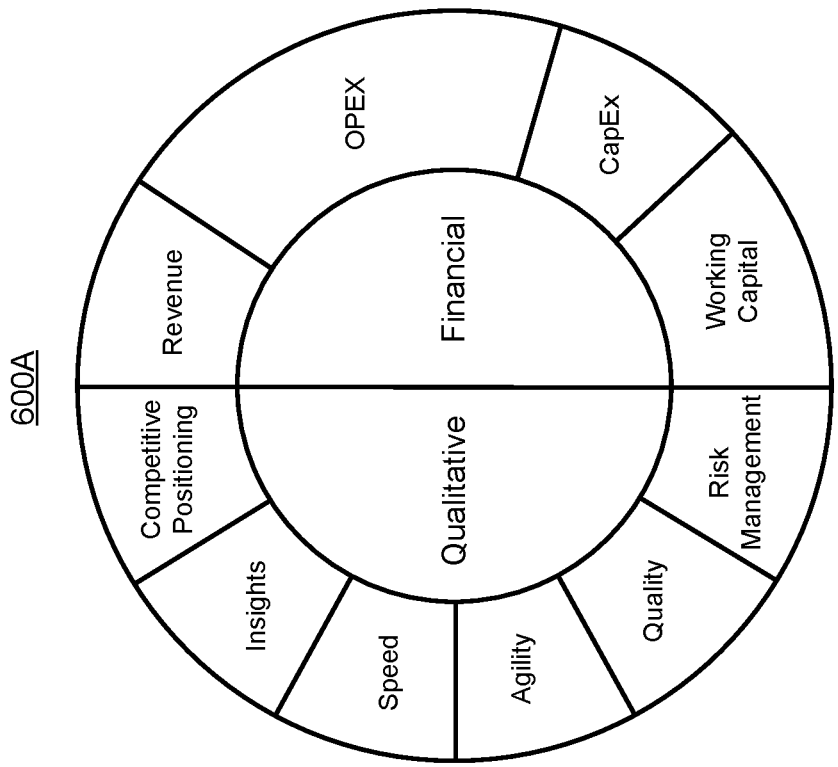

FIG. 6 illustrate graphs 600A and 600B of expanded features and advancements associated with converting a digital content management system, according to an example. As shown in graph 600A, there may be any number of qualitative or financial features assocaited with the shell conversion technique and process described herein. For example, the qualititative benefits may include, but not limited to, competitive positioning in the marketplace (e.g., introducing new products or services, improved customer experience, etc.), analytics-based insights (e.g., better supply chain visibility, improved customer experience, increased customer loyalty, etc.), higher speeds of service and production (e.g., real-time or near real-time data access, reduced operational process cycles, increased efficiency in recall process, etc.), flexbility and agility (e.g., reduced imlementation cycle times, improved execution speed of structural or organizational changes, etc.), improved quality (e.g., improved data and process consistency, reduced manual error, etc.), and notable advantages in risk management (e.g., simplified security measures, enhanced compliance, etc.).

The financial advantages may include, but not limited to, revenue (e.g., reduced margin leakage, increased throughoput and fullfillment levels, identifying cross- and upsell potential, new products and services, etc.), operating expense (OPEX) (e.g., icnrease process efficiency and productivity, decreased production waste and scrapping, desreased warehouse costs, decreased IT maintenance costs, improved maintenance through loT, etc.), capital expenditure (CapEx) (e.g., decreased hardware investment, reduced M&A integration or care-out costs, etc.), and working capital (e.g., decreased inventorylevels, improved mangement of aged and slow-moving material, etc.).

As shown in graph 600B, there may be any number of advantances that are borne from the role-based user experience, application and enhancements, and platform conversions and updates as a result of the the shell conversion technique and process described herein. These may include, for example, more interactivity and collaboration with big data, internet of thing (loT), various business neetworks, social networks, real-time or near real-time processing and access, enhanced transactions, open connectivity, and mobility. In other words, these benefits may allow better integration, minimization of conversion downtime, functional simplification, code remediation, custom features, business collboration, infrastructure partner collaboration, cross-functional testing and development, etc. It should be apprecated that these qualititatie, financial, and business advantanges may be results of the technical solutions and process described herein.

Although the methods and systems as described herein may be directed mainly to ERP conversion, it should be appreciated that the systems and methods described above may be used for other types of content or scenarios. Furthermore, the shell conversion process or techniques may be used in other various environments, such as in payment transaction systems, production systems, legacy analytics or reporting systems, or any other system that may require next generation upgrades or conversions, including but not limited to, mobile, telecommunications, social networking, marketing and advertisements, or other digital or data-driven systems and platforms.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

The invention claimed is:

1. A digital content management system, comprising:
one or more non-transitory, processor readable data stores that store and manage data of at least a legacy enterprise resource planning (ERP) system within a network;
at least one processor executing processor-readable instructions from the data stores pertaining to digital content management;
one or more servers that facilitate operations of the digital content management using information from the one or more data stores; and
a final enterprise resource planning (ERP) system that communicates with the one or more servers and the one or more data stores in the network, the final ERP system created based on a shell conversion technique from the legacy ERP system, the shell conversion technique comprising the following:
make a copy of the legacy ERP system;
duplicate the copy of the legacy ERP system;
dissociate the data of the legacy ERP from the duplicate copy of the legacy ERP system,
wherein the data includes current and historic data of the ERP system;
create a base shell from the duplicate copy of the legacy ERP system,
wherein the base shell includes applications of the legacy ERP system without the data of the legacy ERP system;
perform a Unicode conversion of the base shell of the legacy ERP system;
upgrade the Unicode converted base shell of the legacy ERP system to a next generation ERP system;
perform a remediation of the upgraded next generation ERP system;
make a copy of the remediated and upgraded next generation ERP system;
create at least one of a development ERP system, a quality ERP system, or a production ERP system from the copy of the remediated and upgraded next generation ERP system; and
provide the final ERP system, the final ERP system based on at least one of the created development ERP system, quality ERP system, or production ERP system.

2. The system of claim 1, wherein the shell conversion technique further comprises:
making a second copy of the legacy ERP system, the second copy serving as a backup copy of the legacy ERP system.

3. The system of claim 1, wherein the shell conversion technique further comprises:
  making a second copy of the remediated and upgraded next generation ERP system, the second copy serving as a backup copy of the remediated and upgraded next generation ERP system.

4. The system of claim 1, wherein creating the base shell from the copy of the legacy ERP system comprises:
  identifying target applications for reuse in the final ERP system, wherein the target applications are identified from the applications of the legacy ERP system;
  identifying obsolete applications or functions, wherein the obsolete applications or functions are identified from the applications of the legacy ERP system.

5. The system of claim 4, wherein the shell conversion technique further comprises:
  formatting and migrating the data including the current data and the historical data; and
  re-associating the data with the copy of the remediated and upgraded next generation ERP system.

6. The system of claim 4, wherein performing the remediation of the upgraded next generation ERP system comprises:
  remediating the target applications for reuse in the final ERP system; and
  adding additional applications or functions to the upgraded next generation ERP system.

7. The system of claim 1, wherein the final ERP system communicates with at least one of the following data sources: a website, a document, a database, a web feed, a sensor, a geolocation data source, a server, an analytics system, a mobile computing device, a planning and forecasting system, or a visualization and reporting system.

8. A method for converting a legacy enterprise resource planning (ERP) system to a final enterprise resource planning (ERP) system, the method comprising:
  making, by a computing device, a copy of the legacy ERP system;
  duplicating, by the computing device, the copy of the legacy ERP system;
  dissociating by the computing device data of the legacy ERP system from the duplicate copy of the legacy ERP system,
    wherein the data includes current data and historic data from the duplicate of the legacy ERP system;
  creating, by the computing device, a base shell from the duplicate copy of the legacy ERP system,
    wherein the base shell includes applications of the legacy ERP system without the data of the legacy ERP system;
  performing, by the computing device, a Unicode conversion of the base shell of the legacy ERP system;
  upgrading, by the computing device, the Unicode converted base shell of the legacy ERP system to a next generation ERP system;
  performing, by the computing device, a remediation of the upgraded next generation ERP system;
  making, by the computing device, a copy of the remediated and upgraded next generation ERP system;
  creating, by the computing device, at least one of a development ERP system, a quality ERP system, or a production ERP system from the copy of the remediated and upgraded next generation ERP system; and
  providing, by the computing device, the final ERP system, the final ERP system based on at least one of the created development ERP system, quality ERP system, or production ERP system.

9. The method of claim 8, the shell conversion technique further comprises:
  making a second copy of the legacy ERP system, the second copy serving as a backup copy of the legacy ERP system.

10. The method of claim 8, wherein the shell conversion technique further comprises:
  making a second copy of the remediated and upgraded next generation ERP system, the second copy serving as a backup copy of the remediated and upgraded next generation ERP system.

11. The method of claim 8, wherein creating the base shell from the copy of the legacy ERP system comprises:
  identifying target applications for reuse in the final ERP system, wherein the target applications are identified from the applications of the legacy ERP system;
  identifying obsolete applications or functions, wherein the obsolete applications or functions are identified from the applications of the legacy ERP system.

12. The method of claim 11, wherein the shell conversion technique further comprises:
  formatting and migrating the data including the current data and the historical data; and
  re-associating the data with the copy of the remediated and upgraded next generation ERP system.

13. The method of claim 11, wherein performing the remediation of the upgraded next generation ERP system comprises:
  remediating the target applications for reuse in the final ERP system; and
  adding additional applications or functions to the upgraded next generation ERP system.

14. The method of claim 8, wherein the final ERP system communicates with at least one of the following data sources: a website, a document, a database, a web feed, a sensor, a geolocation data source, a server, an analytics system, a mobile computing device, a planning and forecasting system, or a visualization and reporting system.

15. A non-transitory computer-readable storage medium having an executable stored thereon, which when executed instructs a processor to perform the following method:
  making a copy of the legacy enterprise resource planning (ERP) system;
  duplicating the copy of the legacy ERP system;
  dissociating data of the legacy ERP system from the duplicate copy of the legacy ERP system,
    wherein the data includes current data and historic data from the duplicate of the legacy ERP system;
  creating a base shell from the duplicate copy of the legacy ERP system
    wherein the base shell includes applications of the legacy ERP system without the data of the legacy ERP system;
  performing a Unicode conversion of the base shell of the legacy ERP system;
  upgrading the Unicode converted base shell of the legacy ERP system to a next generation ERP system;
  performing a remediation of the upgraded next generation ERP system;
  making a copy of the remediated and upgraded next generation ERP system;
  creating at least one of a development ERP system, a quality ERP system, or a production ERP system from the copy of the remediated and upgraded next generation ERP system; and providing the final ERP system, the final ERP system based on at least one of the created development ERP system, quality ERP system, or production ERP system.

16. The non-transitory computer-readable storage medium of claim 15, wherein the shell conversion technique further comprises:
making a second copy of the legacy ERP system, the second copy serving as a backup copy of the legacy ERP system.

17. The non-transitory computer-readable storage medium of claim 15, wherein the shell conversion technique further comprises:
making a second copy of the remediated and upgraded next generation ERP system, the second copy serving as a backup copy of the remediated and upgraded next generation ERP system.

18. The non-transitory computer-readable storage medium of claim 15, wherein creating the base shell from the copy of the legacy ERP system comprises:
identifying target applications for reuse in the final ERP system, wherein the target applications are identified from the applications of the legacy ERP system;
identifying obsolete applications or functions, wherein the obsolete applications or functions are identified from the applications of the legacy ERP system; and
dissociating historical data associated with the copy of the legacy ERP system.

19. The non-transitory computer-readable storage medium of claim 18, wherein the shell conversion technique further comprises:
formatting and migrating the data; and
re-associating the data with the copy of the remediated and upgraded next generation ERP system.

20. The non-transitory computer-readable storage medium of claim 18, wherein performing the remediation of the upgraded next generation ERP system comprises:
remediating the target applications for reuse in the final ERP system; and
adding additional applications or functions to the upgraded next generation ERP system.

* * * * *